(12) United States Patent
Lybarger et al.

(10) Patent No.: US 7,051,470 B2
(45) Date of Patent: May 30, 2006

(54) BATTERY POWERED LIGHTED ROD

(75) Inventors: Michael A. Lybarger, Broken Arrow, OK (US); Robert D. Sherwood, Tulsa, OK (US); Micah Jones, Tulsa, OK (US); Hyunkyu Kim, Broken Arrow, OK (US)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 310 days.

(21) Appl. No.: 10/141,502

(22) Filed: May 8, 2002

(65) Prior Publication Data
US 2003/0019145 A1 Jan. 30, 2003

Related U.S. Application Data

(63) Continuation-in-part of application No. 09/666,492, filed on Sep. 18, 2000, now Pat. No. 6,594,942.

(51) Int. Cl.
*A01K 87/00* (2006.01)
(52) U.S. Cl. ............... 43/17.5; 43/18.1 R; 362/84; 362/109
(58) Field of Classification Search .......... 43/17.5, 43/18.1 R; 362/84, 109, 119, 120
See application file for complete search history.

(56) References Cited

U.S. PATENT DOCUMENTS

| | | | | |
|---|---|---|---|---|
| 1,746,024 A | * | 2/1930 | Brandt, Sr. ............... 313/358 |
| 2,349,077 A | * | 5/1944 | Comparelli ............. 43/18.1 R |
| 3,017,499 A | * | 1/1962 | Fore ............................ 43/17.5 |
| 3,978,330 A | * | 8/1976 | Maurer ........................ 362/158 |
| 4,085,437 A | * | 4/1978 | Hrdlicka et al. ........... 362/109 |
| 4,117,618 A | * | 10/1978 | Utsler ........................ 43/17.5 |
| 4,144,557 A | * | 3/1979 | Kerr et al. .................... 362/84 |
| 4,369,486 A | * | 1/1983 | Pool ............................ 362/577 |
| 4,621,447 A | | 11/1986 | Rhodes ........................ 43/17.5 |
| 4,678,450 A | * | 7/1987 | Scolari et al. ............. 446/405 |
| 4,766,688 A | | 8/1988 | Hiles ............................ 43/17 |
| 4,775,920 A | * | 10/1988 | Seibert et al. ............. 362/109 |
| 5,034,847 A | * | 7/1991 | Brain ........................... 362/84 |
| 5,083,247 A | * | 1/1992 | Robinson et al. .......... 362/109 |
| 5,129,174 A | | 7/1992 | Wilson ......................... 43/17 |
| 5,172,508 A | | 12/1992 | Schmidt et al. ............ 43/18.1 |

(Continued)

FOREIGN PATENT DOCUMENTS

JP 2001-299155 A * 10/2001

(Continued)

OTHER PUBLICATIONS

"Fluorescent Lighting, Fluorescent Light Ballast", Household Lighting, Available web site: http://hyperphysics.phy-astr.gsu.edu/hbase/electric/lighting.html, Accessed on : Sep. 2, 2005.*

(Continued)

*Primary Examiner*—Darren W. Ark
(74) *Attorney, Agent, or Firm*—Fellers, Snider, Blankenship, Bailey & Tippens, P.C.

(57) ABSTRACT

A battery-powered lighted fishing rod including: a handle having a forward end; a shaft extending from the forward end of the handle; an electroluminescent lamp secured the shaft; and a power source for supplying electrical power to the electroluminescent lamp. In one embodiment, the handle includes a housing which houses a battery and a DC-to-AC inverter for converting the relatively low battery voltage to a relative high AC voltage suitable for driving the electroluminescent lamp and a cover. The cover mates with the housing to form a gripping surface on the handle.

14 Claims, 5 Drawing Sheets

U.S. PATENT DOCUMENTS

| | | | | |
|---|---|---|---|---|
| 5,182,873 | A * | 2/1993 | Aragon, Jr. | 43/17.5 |
| 5,276,990 | A * | 1/1994 | Ramirez | 43/17.5 |
| 5,279,513 | A * | 1/1994 | Connelly | 446/219 |
| 5,347,741 | A * | 9/1994 | Konrad | 43/17.5 |
| 5,357,410 | A * | 10/1994 | Cota et al. | 362/109 |
| 5,400,008 | A * | 3/1995 | Toohey | 362/109 |
| 5,469,342 | A * | 11/1995 | Chien | 362/84 |
| 5,495,401 | A * | 2/1996 | Evans | 362/84 |
| 5,524,831 | A | 6/1996 | Carlson | 242/223 |
| 5,566,493 | A * | 10/1996 | Minorics | 43/17.5 |
| 5,586,403 | A * | 12/1996 | Ward | 43/17.5 |
| 5,615,941 | A * | 4/1997 | Shecter | 362/109 |
| 5,644,864 | A * | 7/1997 | Kelly | 43/17.5 |
| 5,730,079 | A * | 3/1998 | Totty et al. | 114/343 |
| 5,738,433 | A | 4/1998 | Sparks | 362/109 |
| 5,775,016 | A * | 7/1998 | Chien | 362/84 |
| 5,797,670 | A * | 8/1998 | Snoke et al. | 362/119 |
| 5,826,366 | A * | 10/1998 | Matibe | 43/17.5 |
| 5,855,084 | A | 1/1999 | Huddleston et al. | 43/17.5 |
| 5,913,671 | A * | 6/1999 | Fernandez et al. | 43/18.1 R |
| 5,929,571 | A * | 7/1999 | Pauly | 362/84 |
| 5,982,112 | A | 11/1999 | Pringle et al. | 315/289 |
| 5,983,553 | A | 11/1999 | Gordon | 43/17.6 |
| 6,000,808 | A | 12/1999 | Hansen | 362/109 |
| 6,061,946 | A | 5/2000 | Toelken | 43/17.5 |
| 6,070,987 | A * | 6/2000 | Jarvik | 362/84 |
| 6,074,071 | A * | 6/2000 | Baumberg et al. | 362/101 |
| 6,075,322 | A * | 6/2000 | Pauly | 362/84 |
| 6,149,286 | A * | 11/2000 | Wiggins | 43/17.5 |
| 6,179,431 | B1 * | 1/2001 | Chien | 362/84 |
| 6,370,809 | B1 | 4/2002 | Drew et al. | 43/17 |
| 6,405,475 | B1 * | 6/2002 | Wallace et al. | 43/17.5 |
| 6,446,380 | B1 * | 9/2002 | Radosavljevic et al. | 43/17.5 |
| 6,578,312 | B1 * | 6/2003 | Artz | 43/17.5 |
| 6,594,942 | B1 * | 7/2003 | Sherwood et al. | 43/17.5 |
| 6,779,913 | B1 * | 8/2004 | Niezrecki et al. | 362/84 |
| 6,789,348 | B1 * | 9/2004 | Kneller et al. | 43/17.5 |
| 6,817,731 | B1 * | 11/2004 | Tufte | 362/84 |
| 6,874,904 | B1 * | 4/2005 | Hsu | 362/84 |
| 6,976,762 | B1 * | 12/2005 | Chien | 362/84 |
| 2004/0159039 | A1 * | 8/2004 | Yates et al. | 43/17.5 |
| 2004/0257822 | A1 * | 12/2004 | Hopkins | 362/477 |

FOREIGN PATENT DOCUMENTS

| | | | |
|---|---|---|---|
| JP | 2001-299156 A | * | 10/2001 |
| JP | 2002-125528 A | * | 5/2002 |
| JP | 2004-33212 A | * | 2/2004 |

OTHER PUBLICATIONS

Dankoff, Wendy, "Glossary: Solar Water Pumping Terms", Available web site: http://www.thesustainablevillage.com/essays/watpumpglossary.html, Accessed on: Sep. 2, 2005.*

Sipex, *SP4405 Low Voltage Electroluminescent Lamp Driver with Regulated Output Voltage*, SP4405DS/18, 1998, p. 1-20.

* cited by examiner

BATTERY POWERED LIGHTED ROD

CROSS REFERENCE TO RELATED APPLICATION

This is a continuation-in-part of prior filed, U.S. patent application Ser. No. 09/666,492, filed Sep. 18, 2000 now U.S. Pat. No. 6,594,942 which application is incorporated herein by reference.

BACKGROUND OF THE INVENTION

1. Field of the Invention

The present invention relates to lighted fishing rods. More particularly, but not by way of limitation, the present invention relates to a lighted fishing rod having at least one electroluminescent lighting device provided thereon.

2. Background of the Invention

Nighttime fishing is a popular activity for a variety of reasons. Unfortunately, the poor lighting associated with nighttime fishing poses a significant number of problems for the fisherman. For example, it may be difficult, if not impossible for a fisherman to visually discern movement of the tip of the rod which would indicate a strike, it may be difficult to find the rod when there is a strike, it may be difficult to detect line entanglement, other people in the area may not be aware that a fishing line is out, etc.

A number of lighted fishing rods have been developed to address these problems and generally aid the nighttime fisherman. Desirable features of prior art devices include: a tip light which provides a ready indication of a strike; a light which illuminates the line guides so the fisherman can observe the fishing line along the pole; a light forward of the reel so that a fisherman can observe the line coming off the reel or have increased light to aid in baiting the line; and a strike sensor so that one or more lights will automatically illuminate when a fish strikes the bait. Generally, these prior art rods house batteries in the rod handle to provide power to the lights as well as a switch for manipulating the lights.

Many of the prior art devices employ a light source housed in the handle in conjunction with a device to transport the light to where it is needed. The light sources employed in these devices, such as incandescent bulbs, tend to have shapes which are not conducive to placement on the rod itself, thus the need to house the light source in the handle and for the transport mechanism. Such devices either illuminate the interior of a transparent or translucent rod, cast a beam along the exterior of the a rod to illuminate the fishing line, or illuminate the rod via a fibre optic strand. These devices favor incandescent bulbs which are relatively inefficient resulting in reduced battery life and which have relatively short bulb life.

One limitation of rods employing incandescent bulbs, or other types of lamps which emit light from a point, is that it is difficult to achieve even illumination over an area. Even with a transport mechanism such as a fiber optic, light piping material, or a transparent rod, the brightness will be greatest near the bulb.

U.S. Pat. No. 6,061,946 issued to Toelken discloses a lighted rod wherein an LED is placed in the tip of the rod such that the fisherman can visually detect movement of the tip, in response to a strike, in nighttime use. While the LED may somewhat alleviate concerns of efficiency and bulb life, it does not provide sufficient light to monitor the line through the line guides, it is not conducive to mounting along the rod, and, typically, LED's tend to emit light in a beam like pattern and therefore the brightness of the LED will vary significantly depending on the viewing angle. In addition, the LED of the U.S. Pat. No. 6,061,946 device is not positioned such that it will illuminate any part of the rod other than the tip. Accordingly, the U.S. Pat. No. 6,061,946 apparatus is limited in application to aiding in the detection of movement of the tip of the rod.

It is thus an object of the present invention to provide a lighted fishing rod which employs a suitable light source of relatively high efficiency and relatively long life.

It is further object of the present invention to provide a selectable light source directed at meeting the needs of a nighttime angler in detecting movement of the tip of the rod responsive to a fish strike.

It is yet a further object of the present invention to provide a selectable light source directed at meeting the needs of a nighttime angler in monitoring the state of the fishing line along the length of the rod or in working with the fishing line as in baiting a hook or untangling the line.

It is still a further object of the present invention to incorporate a light source which is conducive to placement along any portion of the fishing rod without adversely affecting either the appearance of the rod or functionality of the rod.

SUMMARY OF THE INVENTION

The present invention provides a battery powered lighted fishing rod which satisfies the needs and alleviates the problems mentioned above. As with other lighted fishing rods, the inventive lighted rod houses batteries within the handle to supply power to the light sources and a handle mounted switch for ready access by the fisherman. However, unlike prior art devices, the inventive system comprises at least one electroluminescent (EL) lighting device which emits light over a surface area rather than at a single point thereby reducing the harshness of the emitted light and improving the viewing angle. The EL lighting device is fabricated from a thin flexible material such that the EL device may be attached to the rod by wrapping the material around the rod at a desirable position and adhesively securing the material to the rod.

In one aspect, the inventive apparatus provides broad, even illumination proximate to the tip of the rod to provide a visual indication of a strike in low light or no light conditions.

In another aspect, the present invention provides broad even illumination along a portion of the fishing rod to allow monitoring of the line condition along the rod and to provide a work light for activities such as baiting a hook, untangling the line, and the like.

In still another aspect, the present invention provides a battery powered fishing rod which includes an electrical converter to allow the use of illumination devices which require higher voltage than may practically be provided by conventional batteries in a fishing rod, or which require alternating current for proper operation.

In yet another aspect, the present invention provides a handle for a fishing rod which includes a housing which houses electrical circuitry associated with driving the lamps of a lighted fishing rod and a cover received on the housing to form a gripping surface on the rod.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 6 provides a cutaway end view of the housing portion as seen from perspective 6—6 of FIG. 5.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

While the preferred embodiment of the inventive device is hereinafter shown and described generically as a "fishing rod", it should be understood that fishing rods are available in a variety of styles (e.g. crappie rods, spinning rods, casting rods, trigger rods, and the like) intended for particular species of fish, for particular sizes of fish, for particular fishing environments, etc., and since all such fishing rods share a number of common elements and have similar appearance, and since the present invention is adaptable to all such applications, the term "fishing rod" is to be interpreted broadly to include any style of fishing rod.

Figure 1:
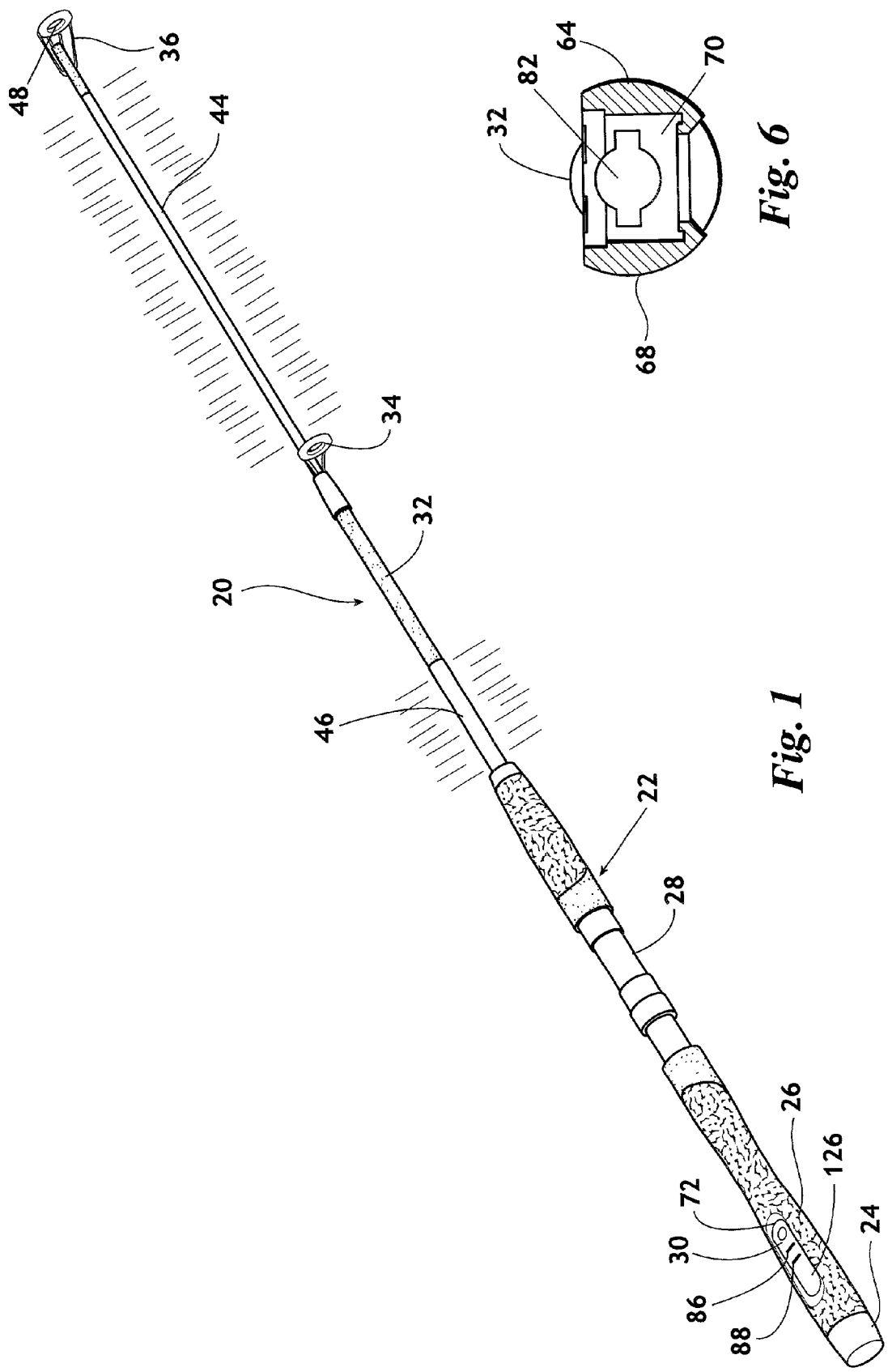
FIG. 1 provides a perspective view of a battery powered fishing rod constructed according to the present invention.

Referring now to the drawings, wherein like reference numerals indicate the same parts throughout the several views, a preferred embodiment of the inventive battery powered lighted rod 20 is shown in FIG. 1. Preferably, rod 20 comprises: a handle assembly 22 having cap 24, grip 26, reel mount 28, and light switch 30; a shaft 32 extending forwardly from the handle assembly 22 having a forward tip 48; line guides 34, and 36, secured to shaft 32 in alignment such that the fishing line will follow a path which is substantially in-line with shaft 32 between line guide 34 and line guide 36; electroluminescent lamp 44 located toward the distal or tip end 48 of shaft 32; and electroluminescent lamp 46 positioned on shaft 32 forward of reel mount 28.

Terms of direction, i.e. forward, rearward, left, right, etc are used to denote directions or positions in reference to the fishing rod when viewed from the perspective of a fisherman using the inventive device. Since a fishing rod is typically held in front of the fisherman, "forward" or "forwardly" would be used in reference to features located toward the distal end 48 of rod 20 while the term "rearward" or "rearwardly" would be used in reference to features located toward the handle 22.

Figure 2:
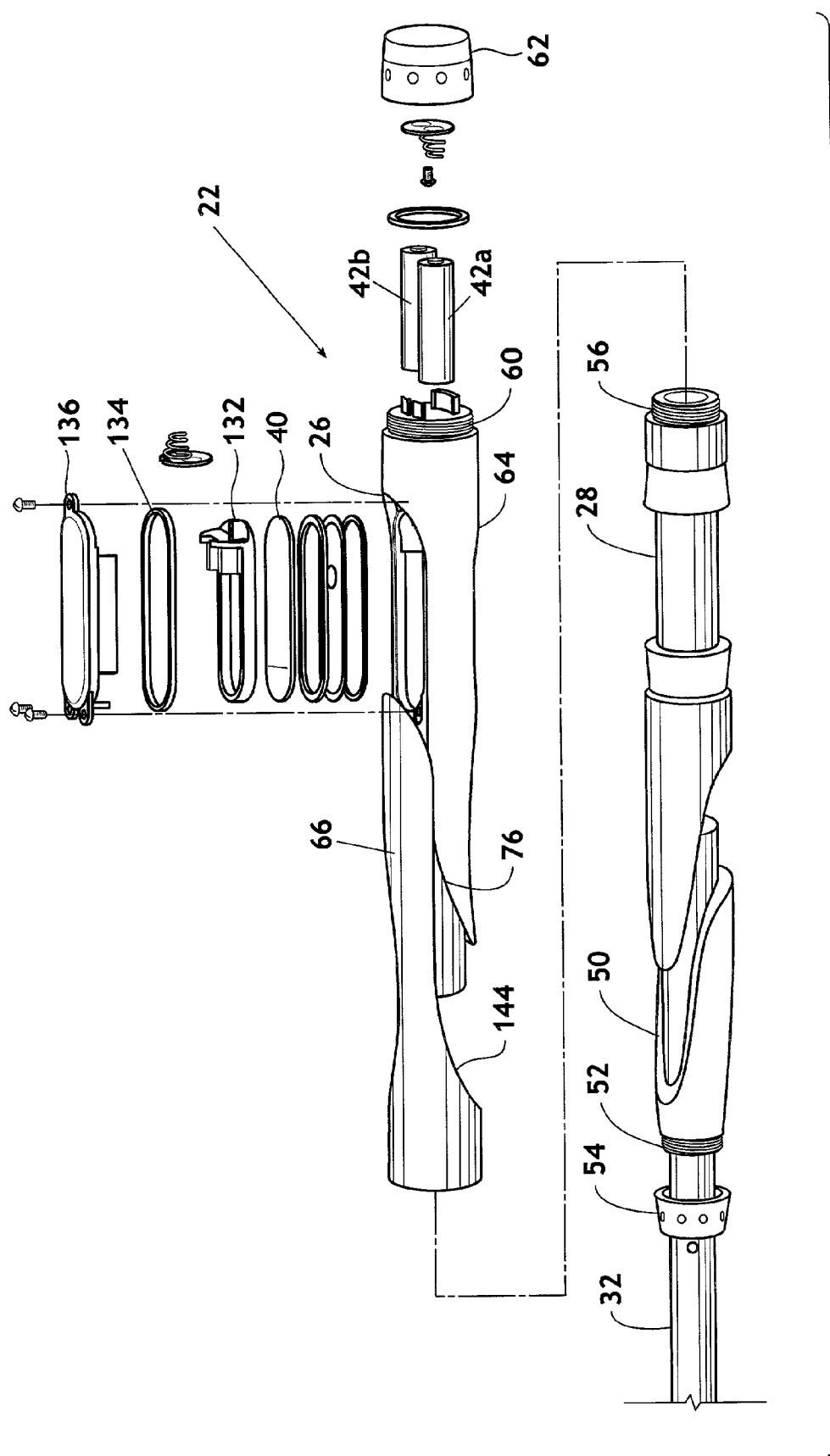
FIG. 2 provides an exploded view of a preferred handle assembly of a battery powered lighted fishing rod constructed according to the present invention.
Figure 4:
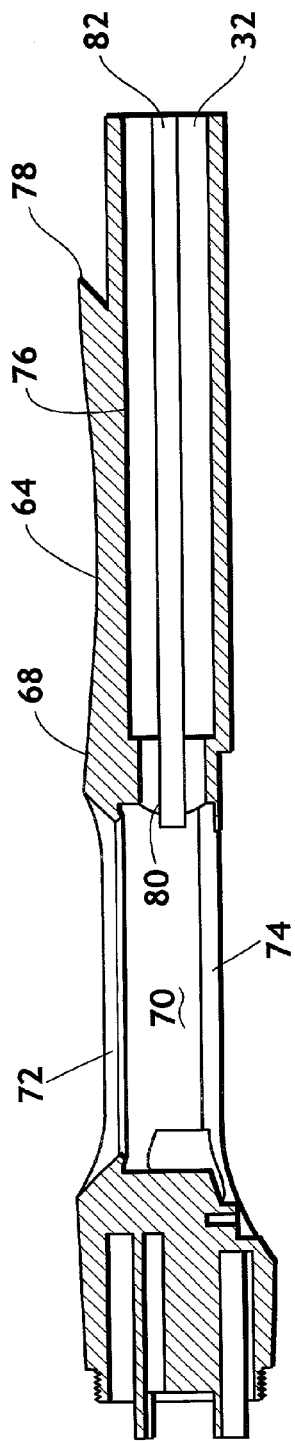
FIG. 4 provides a cutaway side view of the housing portion as seen from perspective 4—4 of FIG. 3.
Figure 3:
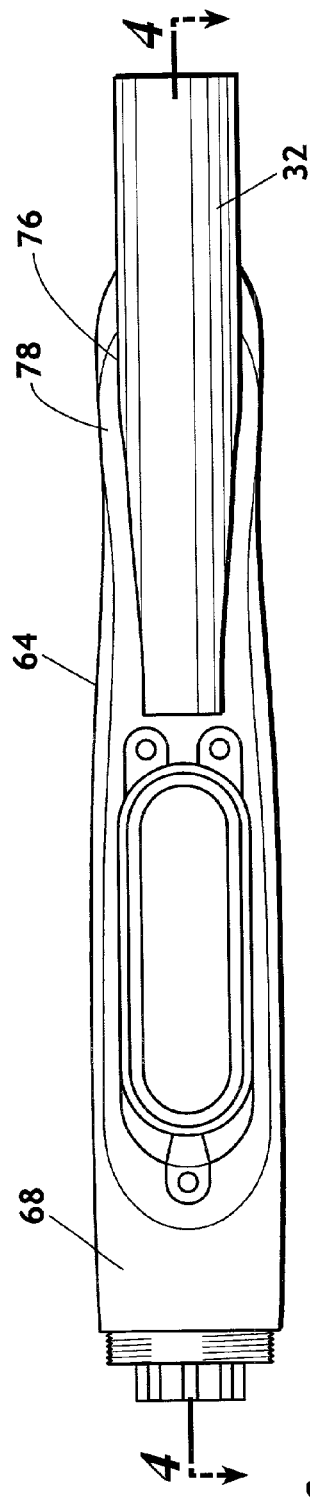
FIG. 3 provides a bottom view of the housing portion of the handle assembly which houses the control circuitry for the inventive lighted rod.
Figure 5:
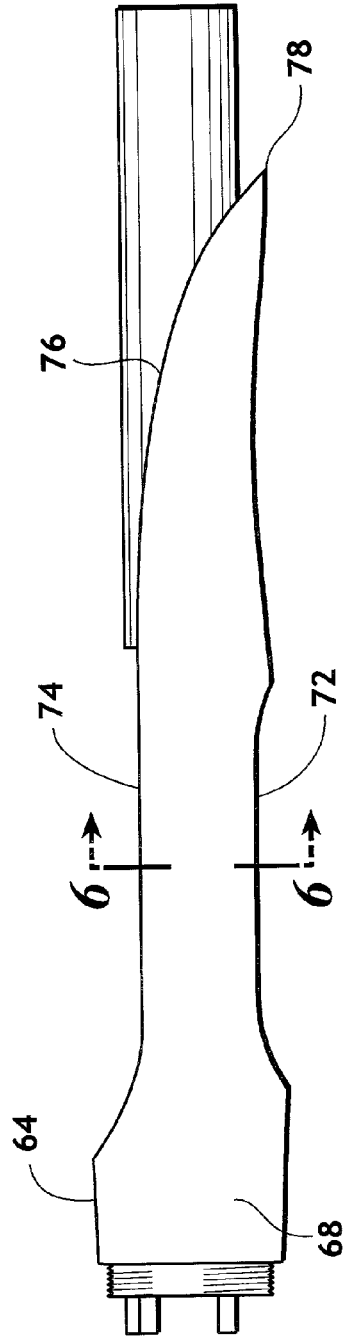
FIG. 5 provides a side view of the housing portion of the handle assembly of the inventive lighted rod.

Referring next to FIG. 2, handle assembly 22 comprises: a front portion 50 having an externally threaded forward boss 52 thereon; a forward cap 54 which is threadedly received on boss 52 to retain shaft 32; a reel mount 28 extending rearwardly from front portion 50 and including an externally threaded boss 56 thereon; a grip assembly 26 threadedly received on boss 56 and having externally threaded rearward boss 60; and battery cap 62 threadedly received on boss 60.

As mentioned above, the present invention employs electroluminescent lamps 44 and 46 (FIG. 1). Such lamps are well known in the art and characteristically emit light evenly over the surface area, or over selected surface areas, of the lamp. Such lamps emit light by exciting a phosphor dielectric with an AC electric field. As will be recognized by those skilled in the art, electroluminescent lamps require a relatively high AC voltage, typically on the order of 150 VAC, while batteries typically provide a relatively low DC voltage. Thus, to power such lamps from readily available batteries, an inverter 40 is required to provide the requisite electrical power to the lamps. Preferably, the inverter 40 and batteries 42a and 42b are housed in grip 26.

A number of considerations arise over the placement of circuitry in the inventive rod. For example, the circuitry is preferably housed in a sealed compartment since fishing rods are invariably used in a wet environment and fishing rods are occasionally dropped into water. Another consideration is in providing a route for wiring between the electroluminescent lamps and the inverter. Yet another consideration is in providing a battery compartment which allows easy replacement of the batteries.

In light of these considerations, grip 26 comprises housing portion 64 and cover 66. With further reference to FIGS. 3–6, housing portion 64 includes: an outer surface 68; cavity 70 formed within the interior of housing portion 64; aperture 72 projecting through outer surface 68 into cavity 70 from the top of housing 64; aperture 74 projecting through outer surface 68 into cavity 70 from the bottom of housing 64. Housing portion 64 also includes a spoon-shaped opening 76 at its forward end 78 for receiving shaft 32. Passageway 80 connects cavity 70 with spoon 76 for passage of wires from control circuitry 40 (FIG. 7) to the center 82 of hollow shaft 32.

Figure 8:
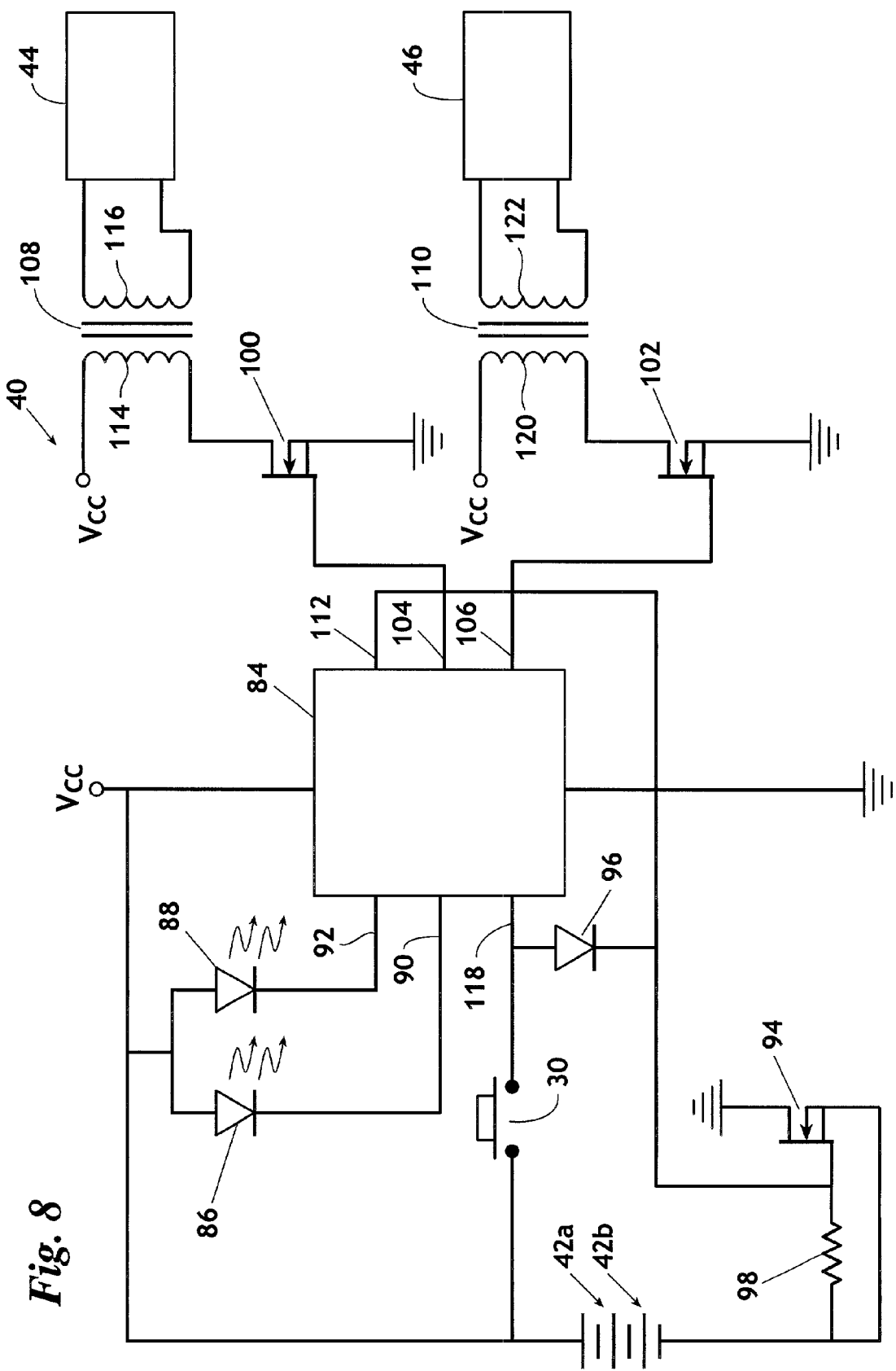
FIG. 8 provides a schematic diagram of preferred control circuitry for the inventive lighted rod.

Referring next to FIG. 8, inverter 40 receives a relatively low, DC voltage, i.e. 3 VDC, from batteries 42a and 42b and, upon operation of switch 30, provides a relatively high, AC voltage to one or both EL lamps 44 and 46. Preferably, inverter 40 comprises: microcontroller 84; indicators 86 and 88 selectively driven by digital outputs 90 and 92, respectively, of microcontroller 84; power control circuitry consisting of transistor 94, diode 96, and resistor 98; a pair of transistors 100 and 102 controlled by digital outputs 104 and 106, respectively; and a pair of transformers 108 and 110.

It should be noted that the term "microcontroller" is used broadly herein to describe describe virtually any type of programmable device. By way of example and not limitation, examples of such devices include: microprocessors; FPGA devices; and programmable logic arrays; as well as devices generically referred to as microcontrollers.

Initially, with the inverter turned off, transistor 94 is held in its non-conducting state by resistor 98 so that current cannot flow from the negative terminal of battery 42b to power the circuit. Upon the depression of switch 30, the gate of transistor 94 is pulled high through diode 96 causing the circuitry to power-up. Once power is applied, microcontroller 84 is programmed to set output 112 to a high state so that transistor 94 will remain in its conducting state after the release of switch 30. Microcontroller 84 then begins toggling output 104 between its high and low states, causing transistor 100 to turn on-and-off in an alternating manner which in turn causes an alternating current to flow through the primary windings 114 of transformer 108. Transformer 108 has a turn ratio such that the voltage presented at its secondary winding 116 is sufficient to drive EL lamp 44.

Switch 30 is also connected to input 118 so that microcontroller 84 can control operation of the inverter 40 based upon subsequent switch closings of switch 30. Upon the next press of switch 30, microcontroller 84 stops toggling output 104 and begins toggling output 106. In the same manner as that described above, transistor 102 produces an alternating current in the primary 120 of transformer 110 to produce a relatively high AC voltage at secondary 122 to drive EL lamp 46.

Upon the next actuation of switch 30, microcontroller 84 resumes the toggling of output 104 so that both EL lamps 44 and 46 illuminate. Upon the fourth press of switch 30, microcontroller 84 sets output 112 low so that, upon the release of switch 30, transistor 94 returns to its non-conducting state thereby powering-down the inverter circuitry. Subsequent presses of switch 30 cause the process to repeat in a cyclic manner.

Indicators 86 and 88 may be cycled on-and-off in a like fashion to that of the EL lamps 44 and 46 to indicate which lamps should be lit or, alternatively, may be used to illuminate switch 30.

Figure 7:
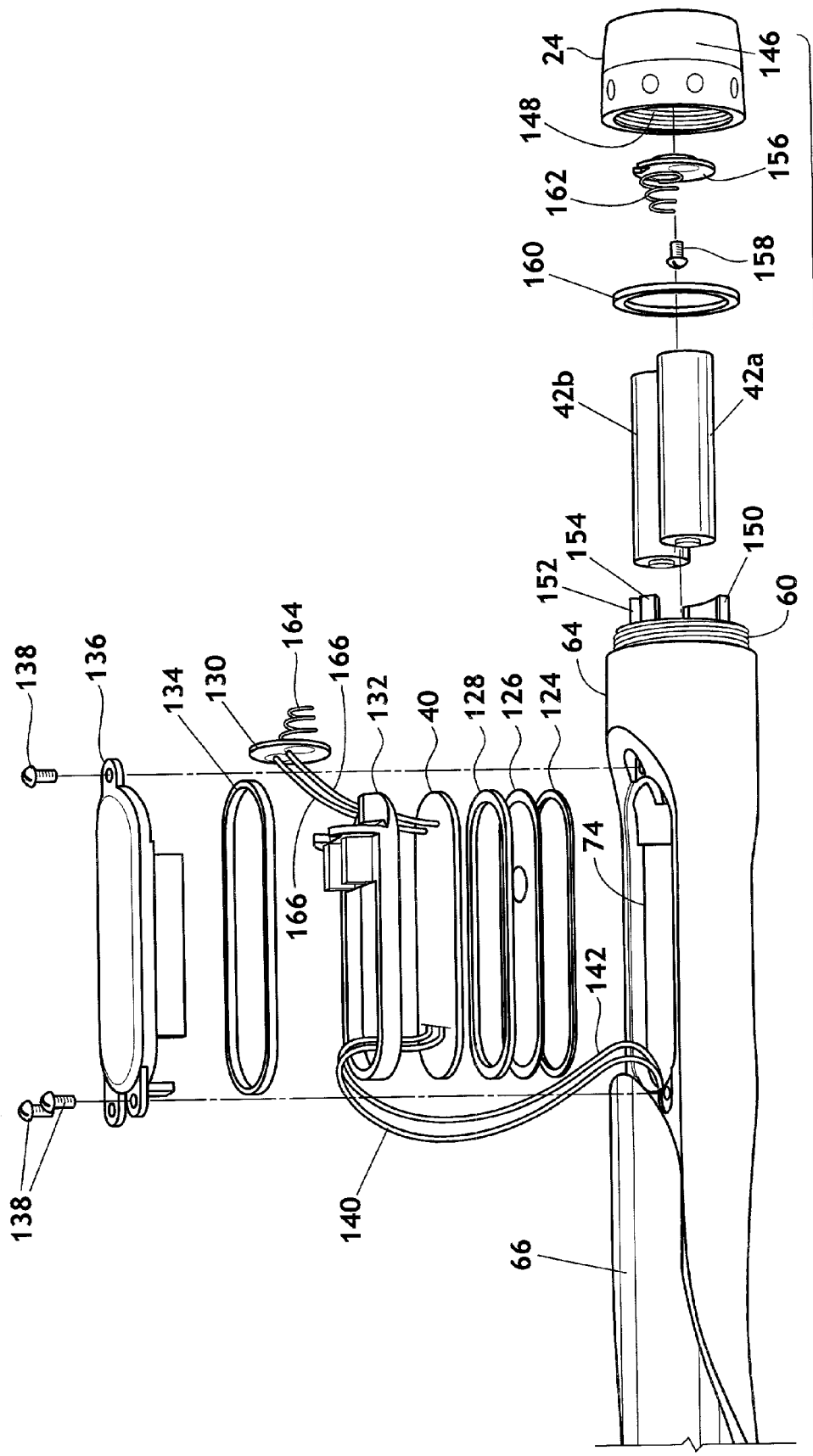
FIG. 7 provides an exploded perspective view of the housing portion showing the assembly of the circuitry into the housing.

Turning now to FIG. 7, from the bottom side of housing 64 (shown vertically inverted in FIG. 7) inverter 40 is sealed into cavity 70 by first inserting seal 124, switch overlay 126, seal 128, inverter 40, battery contact 130, and upper retainer 132 through aperture 74. Seal 134 and lower retainer 136 are secured with screws 138 to housing 64, securing the inverter 40 in its proper location in cavity 70 such that the switch overlay 126 is visible through aperture 72 (as best seen in FIG. 1). It should be noted that, prior to the assembly of the inverter 40 into housing 64, wires 140 and 142 must be routed through the center 82 of shaft 32 (FIG. 6) to EL lamps 44 and 46. Small holes (not shown) may be provided in shaft 32 either below, or adjacent to, lamps 44 and 46 to allow connection of the lamps to wires 140 and 142.

With further reference to FIG. 2, next cover 66 is slid rearward over aperture 74. Cover 66 includes spoon-shaped opening 144 which is complementary to the spoon-shaped opening 76 of housing 64 such that, when cover 66 is properly mated with housing 64, grip portion 26 has a cylindrical appearance, providing a comfortable gripping surface for the fisherman and locating switch 30 in a position where it is easily accessible by the fisherman and indicators 86 and 88 in a visible location.

Continuing with FIG. 7, cap 24 includes an outer shell 146 rotatably secured to an insert 148. Insert 148 includes keyways (not shown) which receive keys 150, 152, and 154 of grip portion 26 to insure insert 148 stays properly aligned with batteries 42a and 42b. Battery pad 156 is secured to insert 148 with screw 158 and is preferably formed of a conductive material which contacts the positive terminal of battery 42a. Spring 162 then contacts the negative terminal of battery 42a to connect the two batteries 42a and 42b in series. Seal 160 is received over boss 60 such that, when cap 24 is tightened onto grip 26, the connection will be watertight.

When cap 24 is secured on grip 26, batteries 42a and 42b are pushed forward into battery contact 130 such that spring 164 is in contact with the negative terminal of battery 42b. Electrical power is delivered to inverter 40 from battery contact 130 by wires 166.

Thus assembled, the inventive lighted rod is ready to receive a fishing reel. For night time fishing, the fisherman can simply operate the switch 30 as described above to selective illuminate either EL lamp 44 or 46, or both.

As will be apparent to those skilled in the art, while the inventive lighted fishing rod has been described as using a microcontroller based inverter, alternative designs are possible, and such design are within the scope and spirit of the present invention. By way of example and not limitation, an inverter using discrete logic, as opposed to a microcontroller device, could be employed.

As will also be apparent to those skilled in the art, while the preferred embodiment of the inventive fishing rod has been shown and described as having two EL lamps, one located towards the distal end and one placed towards the handle end, the number of EL lamps, and their placement along the rod is not critical to the present invention. Thus, embodiments of the present invention are possible having any number of EL lamps.

It will be understood by those skilled in the art that while the preferred embodiment of the inventive device has been discussed with reference to electroluminescent lamps, similar results may be obtained with certain types of gas discharge lamps. Such lamps likewise require excitation with a high voltage source, thus requiring an inverter to increase the voltage supplied by the battery to a level suitable for operation of the gas discharge device.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A battery-powered lighted fishing rod comprising:
   a handle having:
   an inverter housed within said handle, said inverter having an input for receiving a DC voltage and a first output suitable for driving an electroluminescent lamp; and
   at least one battery housed within said handle, said battery providing a DC voltage to said input;
   a shaft extending from said forward end, said shaft having a hollow interior; and
   a first electroluminescent lamp secured to said shaft and in electrical communication with said output, wherein the electrical communication comprises a wire in said hollow interior; and
   wherein said electroluminescent lamp projects light radially from substantially the circumference of said shaft.

2. The battery-powered lighted fishing rod of claim 1 wherein said first output is one output of a plurality of outputs of said inverter, each of said outputs providing a voltage suitable for driving an electroluminescent lamp and wherein said first electroluminescent lamp is one electroluminescent lamp of a plurality of electroluminescent lamps and wherein each electroluminescent lamp is in electrical communication with one output of said plurality of outputs.

3. The battery-powered lighted fishing rod of claim 2 further comprising a switch in communication with said inverter such that a fisherman may select the illumination of a particular electroluminescent lamp of said plurality of electroluminescent lamps.

4. The battery-powered lighted rod of claim 3 wherein said switch is housed in said handle and accessible from the exterior of said handle.

5. The battery-powered lighted fishing rod of claim 1 wherein said handle further comprises:
   a housing having said inverter housed therein; and
   a cover received over a portion of said housing such that said housing and said cover form a gripping surface.

6. The battery-powered lighted fishing rod according to claim 1 wherein a portion of said handle housing said inverter is a water tight enclosure.

7. A battery-powered lighted fishing rod comprising:
   a handle assembly having a longitudinal housing portion and a longitudinal cover portion;
   a shaft in communication with said handle assembly;
   said housing portion having a forward end defining an opening for receiving said shaft, said housing portion further defining a cavity;
   control circuitry in said cavity;
   a battery chamber defined by said housing portion for receiving batteries therein;
   a conductive member for communicating said control circuitry with said battery chamber;
   wherein said cover portion mates with said housing portion so that a side of said cavity on one side of a longitudinal axis of said housing portion is covered by said cover portion and an opposite side of said cavity on an other side of the longitudinal axis of said housing portion is at least partially uncovered; and
   an electroluminescent lamp on said shaft, said electroluminescent lamp in electrical communication with said control circuitry.

8. The battery-powered lighted fishing rod according to claim 7 wherein:
   said handle assembly has a cylindrical appearance.

9. The battery-powered lighted fishing rod according to claim 7 further comprising:
   a passageway in said handle portion connecting said cavity with said opening;
   said shaft received in said opening, said shaft defining a longitudinal passageway; and
   wires communicating said control circuitry and passing through said passageway of said handle assembly into said longitudinal passageway of said shaft for engaging said electroluminescent lamp on said shaft.

10. The battery-powered lighted fishing rod according to claim 7 wherein:
    said control circuitry comprises an inverter.

11. The battery-powered lighted fishing rod according to claim 7 wherein:
    said cavity communicates with a top side of said housing portion via a top aperture and with a bottom side of said housing portion via a bottom aperture;
    said control circuitry housed in an assembly comprising a first member visible through said top aperture and a second member visible through said bottom aperture; and
    a switch on said first member.

12. The battery-powered lighted fishing rod according to claim 11 further comprising:
    an indicator on said first member wherein said indicator is separate from said lamp.

13. The battery-powered lighted fishing rod according to claim 7 wherein said cavity housing said control circuitry is a water tight enclosure.

14. The battery-powered lighted fishing rod according to claim 7 wherein said electroluminescent lamp projects light radially over substantially the circumference of said shaft.

* * * * *